US012737736B2

(12) United States Patent
Dunaif et al.

(10) Patent No.: US 12,737,736 B2
(45) Date of Patent: Sep. 15, 2026

(54) BLOCKCHAIN INTEROPERABILITY SYSTEM

(71) Applicant: HALLIDAY INTERNATIONAL, INC., San Francisco, CA (US)

(72) Inventors: Griffin Dunaif, San Francisco, CA (US); Phillip Yang, San Leandro, CA (US)

(73) Assignee: Halliday International, Inc., San Francisco, CA (US)

(*) Notice: Subject to any disclaimer, the term of this patent is extended or adjusted under 35 U.S.C. 154(b) by 0 days.

(21) Appl. No.: 19/362,522

(22) Filed: Oct. 20, 2025

(65) Prior Publication Data

US 2026/0044838 A1 Feb. 12, 2026

Related U.S. Application Data

(63) Continuation of application No. 18/964,180, filed on Nov. 29, 2024, now Pat. No. 12,475,442.

(60) Provisional application No. 63/620,611, filed on Jan. 12, 2024, provisional application No. 63/605,372, filed on Dec. 1, 2023.

(51) Int. Cl.
*G06Q 20/06* (2012.01)
*G06Q 20/38* (2012.01)

(52) U.S. Cl.
CPC ......... *G06Q 20/06* (2013.01); *G06Q 20/3823* (2013.01); *G06Q 2220/00* (2013.01)

(58) Field of Classification Search
None
See application file for complete search history.

(56) References Cited

U.S. PATENT DOCUMENTS

| | | | |
|---|---|---|---|
| 10,102,265 | B1 | 10/2018 | Madisetti et al. |
| 10,187,368 | B2 | 1/2019 | Way |
| 11,030,681 | B2 | 6/2021 | Bathen et al. |
| 11,392,955 | B2 | 7/2022 | Thomas et al. |
| 11,756,031 | B1 | 9/2023 | Hamera et al. |

(Continued)

FOREIGN PATENT DOCUMENTS

| | | | |
|---|---|---|---|
| WO | 2019193363 | A1 | 10/2019 |

OTHER PUBLICATIONS

L. Trestioreanu, C. Nita-Rotaru, A. Malhotra and R. State, "SPON: Enabling Resilient Inter-Ledgers Payments with an Intrusion-Tolerant Overlay," 2021 IEEE Conference on Communications and Network Security (CNS), Tempe, AZ, USA, 2021, pp. 92-100, doi: 10.1109/CNS53000.2021.9705048 (Year: 2021).*

(Continued)

*Primary Examiner* — Eduardo Castilho
(74) *Attorney, Agent, or Firm* — Kilpatrick Townsend & Stockton LLP

(57) ABSTRACT

The present disclosure describes a blockchain interoperability system. The system includes one or more memories and one or more processors communicatively coupled to the one or more memories. The one or more processors, individually or collectively, receive a request for a destination token on a destination blockchain, determine, based on one or more data structures, a first blockchain on which an intermediate token can be converted into the destination token, convert, on the first blockchain, the intermediate token into the destination token, and bridge the destination token from the first blockchain to the destination blockchain.

20 Claims, 7 Drawing Sheets

(56) References Cited

U.S. PATENT DOCUMENTS 12,475,442 B2 11/2025 Dunaif et al.
2015/0363769 A1 12/2015 Ronca et al.
2019/0188711 A1* 6/2019 Wu ...................... G06Q 20/227
2019/0253422 A1 8/2019 Treat et al.
2019/0370807 A1 12/2019 Hu et al.
2020/0074461 A1 3/2020 Derosa-grund
2020/0125391 A1 4/2020 Lee et al.
2020/0278958 A1 9/2020 Zhang et al.
2020/0403799 A1 12/2020 De La Rocha GÓmez-arevalillo et al.
2021/0026841 A1* 1/2021 Kumawat ........... G06F 16/2379
2021/0192500 A1 6/2021 Garay et al.
2021/0398211 A1* 12/2021 Maathur .............. G06Q 20/401
2023/0043702 A1 2/2023 Sells et al.
2023/0073337 A1 3/2023 Chan et al.
2023/0206216 A1 6/2023 Lehmann et al.
2023/0334470 A1 10/2023 Beller et al.
2023/0334492 A1 10/2023 Tai et al.
2024/0070659 A1* 2/2024 Boo ....................... G06Q 40/04
2024/0121114 A1 4/2024 Stone et al.
2024/0223388 A1 7/2024 Li et al.
2024/0273486 A1* 8/2024 Bukov ............... G06Q 20/3678
2024/0333521 A1 10/2024 Kaplan et al.

OTHER PUBLICATIONS

"IEEE Standard for Blockchain Interoperability—naming Protocol", Institute of Electrical and Electronics Engineers Std 3203-2023, Apr. 26, 2024, pp. 1-30.
"SoK: Crosschain Token Bridges and Risk", Institute of Electrical and Electronics Engineers International Conference on Blockchain and Cryptocurrency, Aug. 21, 2024, pp. 696-711.
U.S. Appl. No. 18/964,180, "Non-Final Office Action", Apr. 7, 2025, 37 pages.
U.S. Appl. No. 18/964,180, "Notice of Allowance", Jul. 29, 2025, 12 pages.
Marstein, et al., "Implementing Secure Bridges: Learnings From the Secure Asset Transfer Protocol", Institute of Electrical and Electronics Engineers International Conference on Blockchain and Cryptocurrency (ICBC), Mar. 2023, 9 pages.
Olivieri, et al., "Blockchain Interoperability through Bridges: A Token Transfer Perspective", 6th International Conference on Blockchain Computing and Applications (BCCA), Nov. 2024, pp. 742-748.

* cited by examiner

BLOCKCHAIN INTEROPERABILITY SYSTEM

CROSS-REFERENCE TO RELATED APPLICATIONS

This is application is a continuation of U.S. application Ser. No. 18/964,180, filed Nov. 29, 2024, which claims benefit of U.S. provisional patent application Ser. No. 63/605,372 filed Dec. 1, 2023 and U.S. provisional patent application Ser. No. 63/620,611 filed Jan. 12, 2024, the entirety of each of which is hereby incorporated by reference herein.

TECHNICAL FIELD

Embodiments presented in this disclosure generally relate to blockchain technology. More specifically, embodiments disclosed herein relate to a blockchain interoperability system.

BACKGROUND

Blockchain technology involves decentralized ledgers that store data in blocks linked together in a chain. Blockchains are used in various contexts, including embedded systems, Internet of Things, and healthcare.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
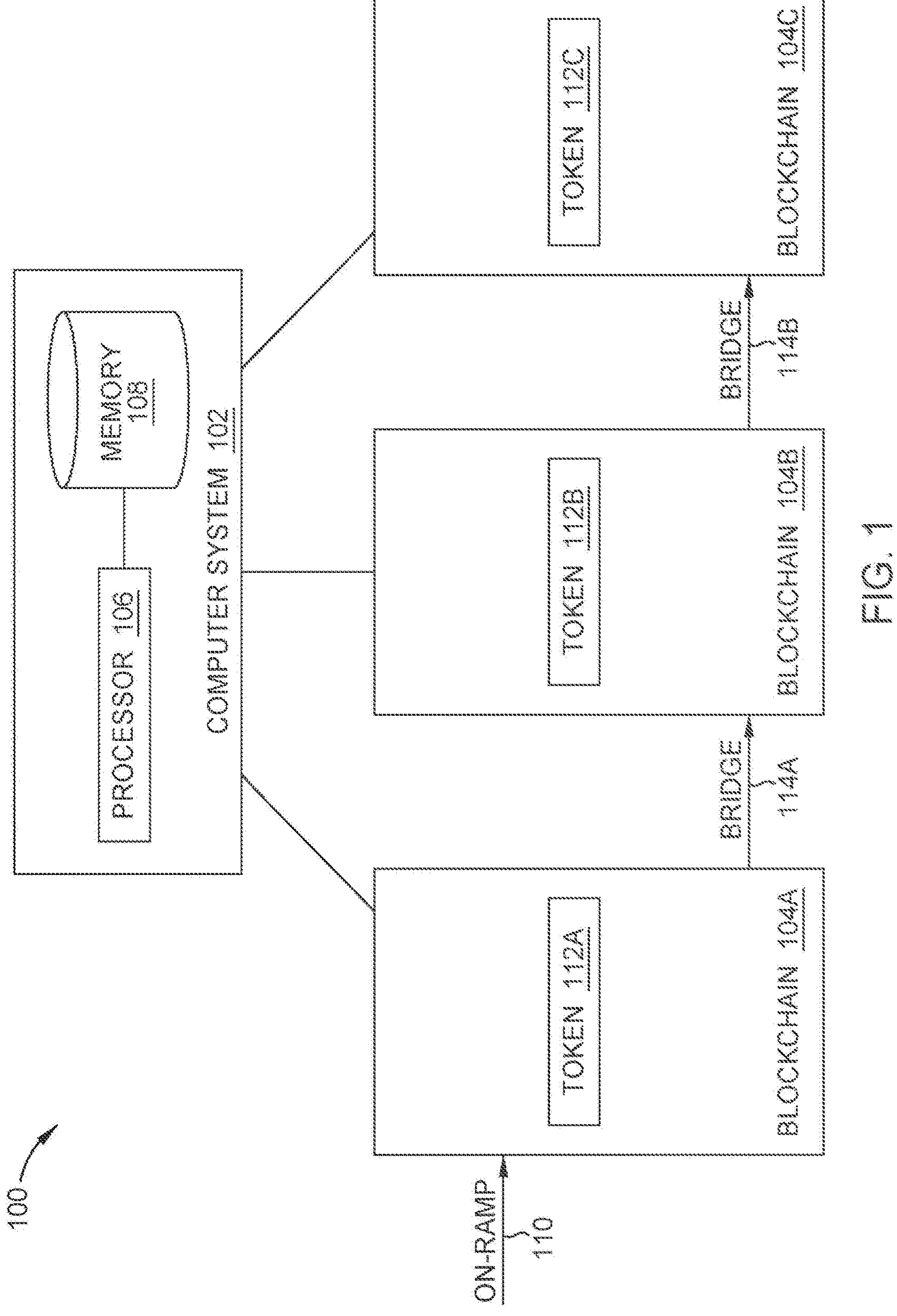
FIG. 1 illustrates an example system.

The present disclosure describes a blockchain interoperability system. According to an embodiment, a computer system includes one or more memories and one or more processors communicatively coupled to the one or more memories. The one or more processors, individually or collectively, receive a request for a destination token on a destination blockchain, determine, based on one or more data structures, a first blockchain on which an intermediate token can be converted into the destination token, convert, on the first blockchain, the intermediate token into the destination token, and bridge the destination token from the first blockchain to the destination blockchain.

According to another embodiment, a computer system includes one or more memories and one or more processors communicatively coupled to the one or more memories. The one or more processors, individually or collectively, receive a request for a destination token on a destination blockchain, determine, based on one or more data structures, that the destination blockchain supports conversions between the destination token and an intermediate token, bridge the intermediate token from a first blockchain to the destination blockchain, and convert, on the destination blockchain, the intermediate token into the destination token.

According to another embodiment, a method includes receiving a request for a destination token on a destination blockchain, determining, based on one or more data structures, a first blockchain on which an intermediate token can be converted into the destination token, converting, on the first blockchain, the intermediate token into the destination token, and bridging the destination token from the first blockchain to the destination blockchain.

EXAMPLE EMBODIMENTS

Blockchain technology involves decentralized ledgers that store data in blocks linked together in a chain. The data is not allowed to be deleted or modified without consensus from the network storing or managing the decentralized ledgers. As a result, blockchains are typically used to maintain or provide data integrity in various contexts, including embedded systems, Internet of Things, and healthcare.

As blockchains become more ubiquitous, however, so does the amount of blockchain types. Different blockchain types may use different types of tokens to operate on the blockchains. As a result, it is challenging to have different blockchains interoperate with each other. For example, if two blockchains use different types of tokens, then the first token type for the first blockchain would need to be converted to the second token type for the second blockchain. It may not be clear, however, whether there is a conversion path from the first token type to the second token type. If the conversion path is not known or determined, then the first blockchain and the second blockchain may not interoperate with each other. As a result, the operation of different blockchain types may be limited and isolated.

The present disclosure describes a blockchain interoperability system that determines pathways for allowing blockchains to interoperate with each other. For example, the system may determine one or more blockchains that provide a path for converting tokens of a first token type for a first blockchain into tokens of a second token type for a second blockchain. As another example, the system may determine one or more blockchains that provide a path for bridging (e.g., moving) the different token types to from the first blockchain to the second blockchain. The system may generate a batch instruction to execute each of the operations (e.g. converting, bridging, etc.) on the determined path. The system may then execute the instruction to conduct these conversions and bridges to allow the first blockchain to interoperate with the second blockchain.

In certain embodiments, the blockchain interoperability system provides several technical advantages. For example, the system may increase interoperability between blockchains that use different token types. As a result, the blockchains are less isolated and provide increased functionality to the blockchain ecosystem. As another example, the system may execute one batch instruction to conduct multiple operations for a determined path, which reduces the amount of time and processing resources used to execute the operations and to implement the path.

FIG. 1 illustrates an example system 100. As seen in FIG. 1, the system 100 includes a computer system 102 and blockchains 104. Generally, the computer system 102 determines pathways that allow the blockchains 104 to interoperate. The computer system includes a processor 106 and a memory 108, which perform the actions or functions of the computer system described herein.

The processor 106 is any electronic circuitry, including, but not limited to one or a combination of microprocessors, microcontrollers, application specific integrated circuits (ASIC), application specific instruction set processor (ASIP), and/or state machines, that communicatively couples to the memory 108 and controls the operation of the computer system 102. The processor 106 may be 8-bit, 16-bit, 32-bit, 64-bit or of any other suitable architecture. The processor 106 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 106 may include other hardware that operates software to control and process information. The processor 106 executes software stored on the memory 108 to perform any of the functions described herein. The processor 106 controls the operation and administration of the computer system 102 by processing information (e.g., information received from the blockchains 104 and memory 108). The processor 106 is not limited to a single processing device and may encompass multiple processing devices contained in the same device or computer or distributed across multiple devices or computers. The processor 106 is considered to perform a set of functions or actions if the multiple processing devices collectively perform the set of functions or actions, even if different processing devices perform different functions or actions in the set.

The memory 108 may store, either permanently or temporarily, data, operational software, or other information for the processor 106. The memory 108 may include any one or a combination of volatile or non-volatile local or remote devices suitable for storing information. For example, the memory 108 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 108, a disk, a CD, or a flash drive. In particular embodiments, the software may include an application executable by the processor 106 to perform one or more of the functions described herein. The memory 108 is not limited to a single memory and may encompass multiple memories contained in the same device or computer or distributed across multiple devices or computers. The memory 108 is considered to store a set of data, operational software, or information if the multiple memories collectively store the set of data, operational software, or information, even if different memories store different portions of the data, operational software, or information in the set.

The blockchains 104 may use different on-ramps 110 and tokens 112. These tokens 112 may be of different types and may not be useable on every blockchain 104. In the example of FIG. 1, the system 100 includes the blockchains 104A, 104B, and 104C. The blockchain 104A uses an on-ramp 110 and a token 112A. The blockchain 104B uses a token 112B. The blockchain 104C uses a token 112C. The tokens 112A, 112B, and 112C may be of different types. Each of the blockchains 104A, 104B, and 104C may not support each of these token types. For example, the blockchain 104A may support the type for the token 112A, but not the types for the tokens 112B and 112C. The blockchain 104B may support the types for the tokens 112A and 112B, but not the type for the token 112C. The blockchain 104C may support the types for the tokens 112B and 112C, but not the type for the token 112A. As a result, it may be difficult for the blockchain 104A to interoperate directly with the blockchain 104C.

The on-ramp 110 may allow users to on-ramp tokens 112A onto the blockchain 104A. For example, the on-ramp 110 may allow users to exchange fiat currency for the tokens 112A. These tokens 112A may then be used to operate on the blockchain 104A. The blockchains 104B and 104C may not include on-ramps, which may limit access to the tokens 112B and 112C that are used to operate on the blockchains 104B and 104C.

Additionally, bridges 114 may carry tokens 112 between some of the blockchains. In the example of FIG. 1, the blockchain 104A has a bridge 114A to the blockchain 104B. Additionally, the blockchain 104B has a bridge 114B to the blockchain 104C. The bridge 114A may support the type for the token 112A, and the bridge 114B may support the type for the token 112B.

In an example operation, the computer system 102 may determine (e.g., using a data structure) a path for interoperating between the blockchains 104A and 104C. For example, the computer system 102 may determine that there is a path to convert the tokens 112A into the tokens 112C through the blockchain 104B. The path may show that tokens 112A may be on-ramped onto the blockchain 104A. Then, the tokens 112A may be moved from the blockchain 104A to the blockchain 104B using the bridge 114A. The tokens 112A may be converted to the tokens 112B on the blockchain 104B. The tokens 112B may then be moved from the blockchain 104B to the blockchain 104C using the bridge 114B. The tokens 112B may then be converted to the tokens 112C on the blockchain 104C. The tokens 112C may then be used to operate on the blockchain 104C. After determining this path, the computer system 102 performs operations to convert the tokens 112A into the tokens 112C according to the path. In this manner, the computer system 102 allows the blockchains 104A and 104C to interoperate, even though the blockchains 104A and 104C use different types of tokens 112.

The bridges 114A and 114B may "move" tokens by implementing pools of tokens on either end of the bridge. For example, to move tokens 112A from the blockchain 104A to the blockchain 104B, the bridge 114A may implement a pool of tokens 112A on the side of the blockchain 104A and another pool of tokens 112A on the side of the blockchain 104B. When one token 112A is to be moved over the bridge 114A, one token 112A may be added into the pool on the side of the blockchain 104A. Then, one corresponding token 112A may be deducted or moved out of the pool on the side of the blockchain 104B. As another example, to move tokens 112B from the blockchain 104B to the blockchain 104C, the bridge 114B may implement a pool of tokens 112B on the side of the blockchain 104B and another pool of tokens 112B on the side of the blockchain 104C. When one token 112B is to be moved over the bridge 114B, one token 112B may be added into the pool on the side of the blockchain 104B. Then, one corresponding token 112B may be deducted or moved out of the pool on the side of the blockchain 104C. In some instances, the bridges 114A and 114B may also implement a conversion during the bridge. For example, the bridge 114A may implement a pool of tokens 112A on the side of the blockchain 104A and another pool of tokens 112B on the side of the blockchain 104B. When one or more tokens 112A are added into the pool on the side of the blockchain 104A, one or more tokens 112B may be deducted or moved out of the pool on the side of the blockchain 104B.

The computer system may support any types of operations involving tokens. For example, the computer system may convert/swap tokens and bridge tokens. The computer system may also transfer tokens from one user to another.

Figure 2:
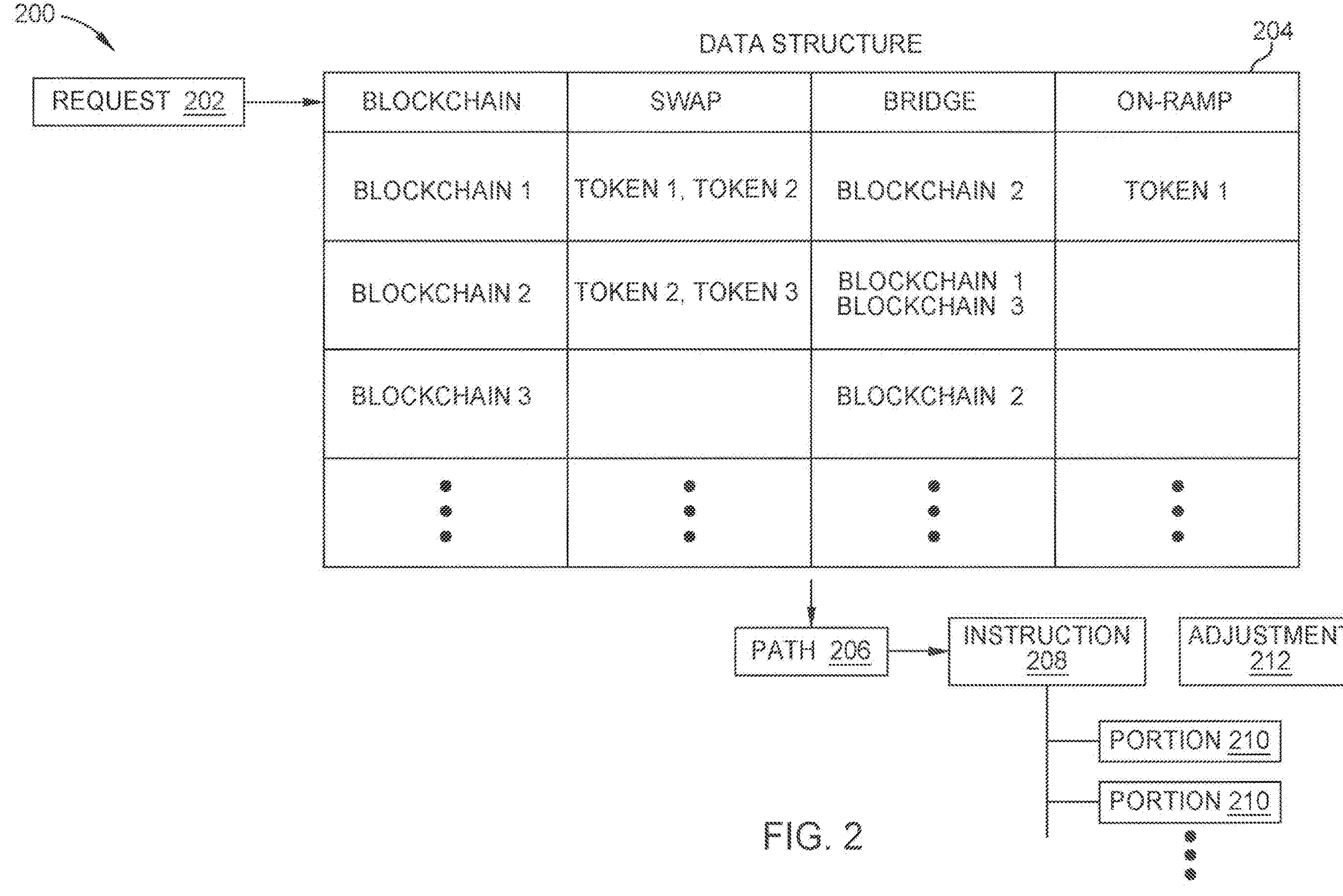
FIG. 2 illustrates an example operation performed by the system of FIG. 1.

FIG. 2 illustrates an example operation 200 performed by the system 100 of FIG. 1. A computer system (e.g., the computer system 102 shown in FIG. 1) may perform the operation 200. By performing the operation 200, the computer system determines a path for converting tokens.

The computer system begins by receiving a request 202. The request 202 may be for a particular type of token, referred to as a destination token, on a blockchain, referred to as a destination blockchain. The computer system may respond to the request 202 by determining how to acquire the destination token on the destination blockchain, which may involve converting tokens on different blockchains.

The computer system stores and uses a data structure 204 that indicates the capabilities of different blockchains and the bridges between these blockchains. The data structure 204 may be any structure. For example, the data structure 204 may be a list, a table, a tree, an object, etc. In the example of FIG. 2, the data structure 204 is a table. The data structure 204 indicates various blockchains and the features available on the blockchains. The first column of the table may identify blockchains. The second column of the table may indicate token types that can be swapped on the blockchains. The third column of the table may indicate other blockchains that have bridges to or from the blockchains. The fourth column may indicate token types that can be on-ramped on the blockchains. For example, the data structure 204 indicates that Blockchain 1 allows Token 1 and Token 2 to be swapped and that Blockchain 1 has a bridge to Blockchain 2. The data structure 204 also indicates that Blockchain 1 has an on-ramp for Token 1. The data structure 204 further indicates that Blockchain 2 allows Token 2 and Token 3 to be swapped and that Blockchain 2 has a bridge from Blockchain 1 and a bridge to Blockchain 3. The data structure 204 also indicates that Blockchain 2 does not have an on-ramp. The data structure 204 indicates that Blockchain 3 does not allow for tokens to be swamped and that Blockchain 3 has a bridge from Blockchain 2.

The computer system analyzes the information in the data structure 204 to determine a path 206 that satisfies the request 202. For example, if the request 202 seeks Token 3 on Blockchain 3, the computer system may determine from the table that the path 206 includes on-ramping Token 1 onto Blockchain 1, converting (e.g., swapping) Token 1 to Token 2 on Blockchain 1, bridging Token 2 from Blockchain 1 to Blockchain 2, converting (e.g., swapping) Token 2 to Token 3 on Blockchain 2, and bridging Token 3 from Blockchain 2 to Blockchain 3. The computer system may then perform these steps in the determined path 206 to fulfill the request 202. In this manner, the data structure 204 serves as a map that indicates how the various blockchains may be used and navigated to acquire different tokens on different blockchains.

In some embodiments, the computer system may also consider other information when determining the path 206. For example, the computer system may consider the location of a user who generated the request 202. The location of the user may be closer to particular servers that implement or store certain blockchains. As a result, it may be faster for those blockchains to be used than other blockchains. Consequently, the computer system may determine a path that uses those blockchains. As another example, the computer system may determine that certain regulations may apply based on the location of the user. The computer system may change the path 206 to satisfy these regulations. As another example, the computer system may adjust or determine the path 206 to satisfy particular limitations that blockchains place on tokens (e.g., the number of tokens that can be used in any operation).

The computer system determines and generates an instruction 208 to implement the path 206. Because the path 206 may be determined using information, such as the location of the user, the instruction 208 may also be considered to be determined using this information. The instruction 208 may be a batch instruction that includes multiple portions 210. Each portion 210 may include an instruction to perform an operation for implementing the path 206. For example, a portion 210 may implement a conversion or swap on a blockchain. Another portion 210 may implement a bridge from one blockchain to another blockchain. The instruction 208 may include any number of portions 210 that implement any number of operations to implement the path 206. The computer system may then execute the instruction 208 to perform operations that implement the determined path 206. In some embodiments, by generating and executing a batch instruction, the computer system reduces the amount of steps needed to perform multiple operations to implement the path 206. As a result, the computer system reduces the amount of computing resources (e.g., processor and memory resources) used to implement the path 206.

The batch instruction may operate on multiple types of tokens. For example, certain portions 210 may implement a number of operations involving a first type of token, and other portions 210 may implement a number of operations involving a second type of token. These operations involving different token types may be executed in parallel and may involve different blockchains.

When executing the instruction 208, the computer system may encounter an error or failure (e.g., a portion 210 of the instruction 208 may fail to execute properly). For example, the instruction 208 may have set an incorrect number of tokens for a conversion or bridge and/or the instruction 208 may have set an incorrect number of gas tokens to fuel the operation. When the instruction 208 fails, the computer system may determine an adjustment 212 to be made to the instruction 208 to remedy the error or failure. For example, the adjustment 212 may adjust a number of tokens used in an operation, adjust a number of gas tokens used to fuel an operation, and/or adjust the instruction to implement an alternate path. The adjustment 212 may change one or more portions 210 of the instruction 208. After making the adjustment 212 to the instruction 208, the computer system may re-execute the instruction 208.

Figure 3:
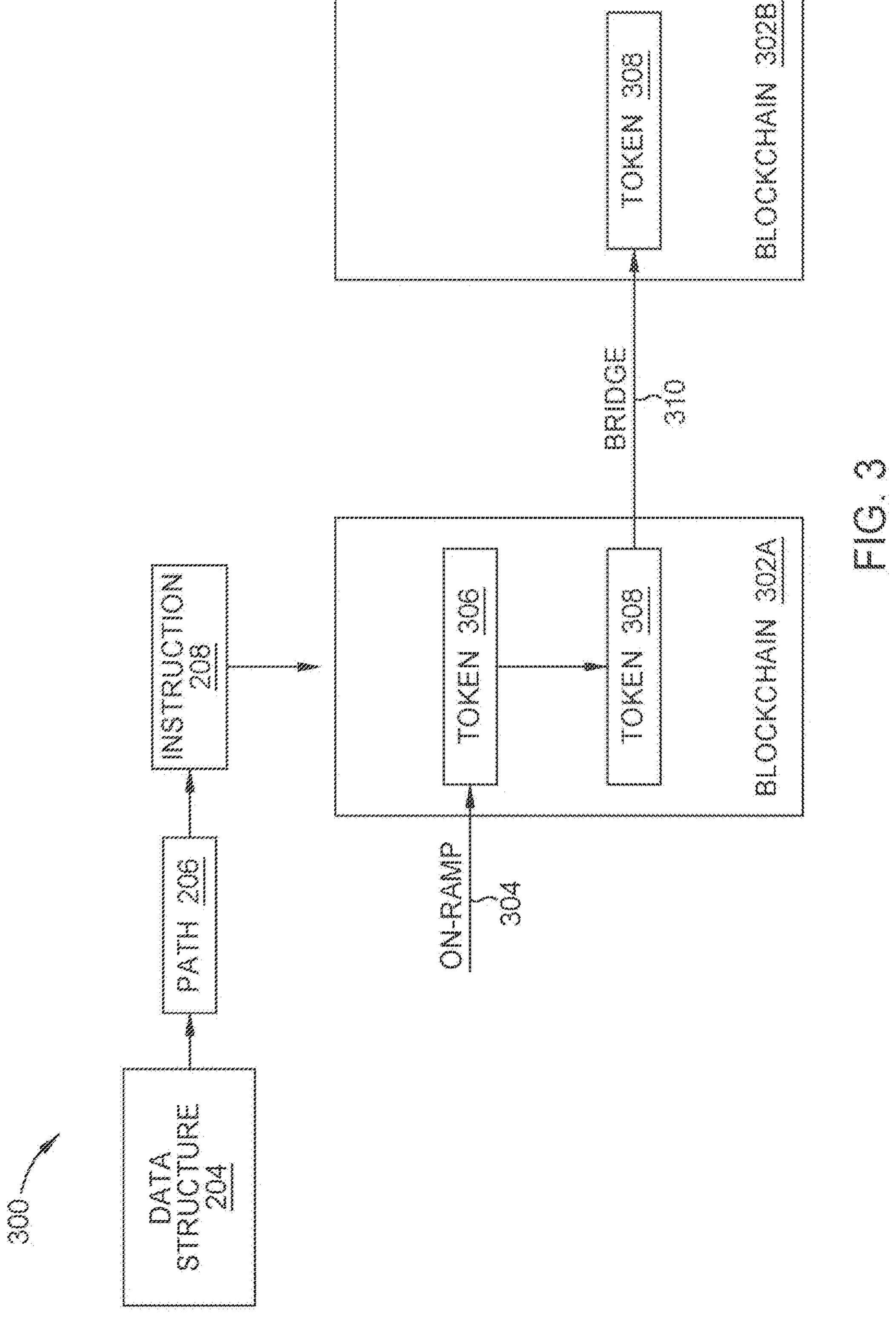
FIG. 3 illustrates an example operation performed by the system of FIG. 1.

FIG. 3 illustrates an example operation 300 performed by the system 100 of FIG. 1. A computer system (e.g., the computer system 102 shown in FIG. 1) may perform the operation 300. By performing the operation 300, the computer system executes an example path.

The computer system begins by determining the path 206 from the data structure 204. The path 206 may indicate how a blockchain 302A and a blockchain 302B (which may be referred to as a destination blockchain) should be used. The computer system follows the path 206 by first using an on-ramp 304 to on-ramp a token 306 (which may be referred to as an intermediate token) on the blockchain 302A. For example, the computer system may exchange a fiat currency for the token 306 on the blockchain 302A. The computer system then follows the path 206 to convert the token 306 into a token 308 (which may be referred to as a destination token) on the blockchain 302A. The token 308 may have a different type than the token 306. In some embodiments, the computer system may use a decentralized exchange on the blockchain 302A to convert (e.g., swap) the token 306 for the token 308.

The computer system then generates an instruction 208 to implement the path 206. The instruction 208 may include multiple portions that each implement a step in the determined path 206. The computer system executes the instruction 208 to perform the operations that implement the path 206.

By executing the instruction, the computer system follows the path 206 to bridge the token 308 from the blockchain 302A to the blockchain 302B using the bridge 310. The bridge 310 may support the token 308 but not the token 306. After the token 308 is bridged to the blockchain 302B, the token 308 is available to use on the blockchain 302B. In this manner, the computer system follows the path 206 to acquire the token 308 on the blockchain 302B.

Figure 4:
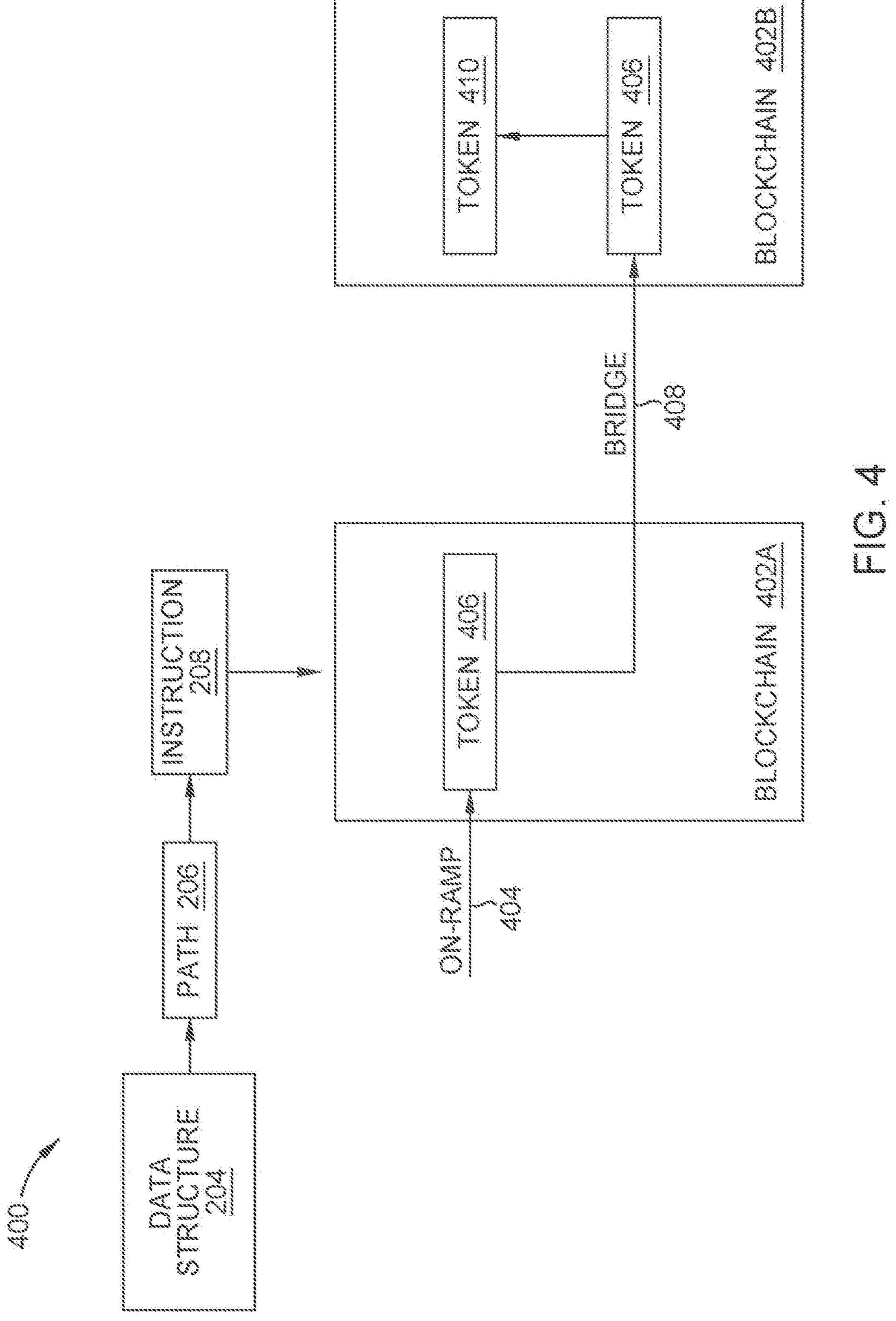
FIG. 4 illustrates an example operation performed by the system of FIG. 1.

FIG. 4 illustrates an example operation 400 performed by the system 100 of FIG. 1. A computer system (e.g., the computer system 102 shown in FIG. 1) may perform the operation 400. By performing the operation 400, the computer system executes an example path.

The computer system begins by determining the path 206 from the data structure 204. The path 206 may indicate how a blockchain 402A and a blockchain 402B (which may be referred to as a destination blockchain) should be used. The computer system follows the path 206 by first using an on-ramp 404 to on-ramp a token 406 (which may be referred to as an intermediate token) on the blockchain 402A. For example, the computer system may exchange a fiat currency for the token 406 on the blockchain 402A. The computer system then follows the path 206 to bridge the token 406 from the blockchain 402A to the blockchain 402B using the bridge 408. The bridge 408 may support the token 406.

The computer system then generates an instruction 208 to implement the path 206. The instruction 208 may include multiple portions that each implement a step in the determined path 206. The computer system executes the instruction 208 to perform the operations that implement the path 206.

By executing the instruction 208, the computer system follows the path 206 to convert the token 406 into a token 410 (which may be referred to as a destination token) on the blockchain 402B. The token 410 may have a different type than the token 406. In some embodiments, the computer system may use a decentralized exchange on the blockchain 402B to convert (e.g., swap) the token 406 for the token 410. The token 410 is then available to use on the blockchain 402B. In this manner, the computer system follows the path 206 to acquire the token 410 on the blockchain 402B.

Figure 5:
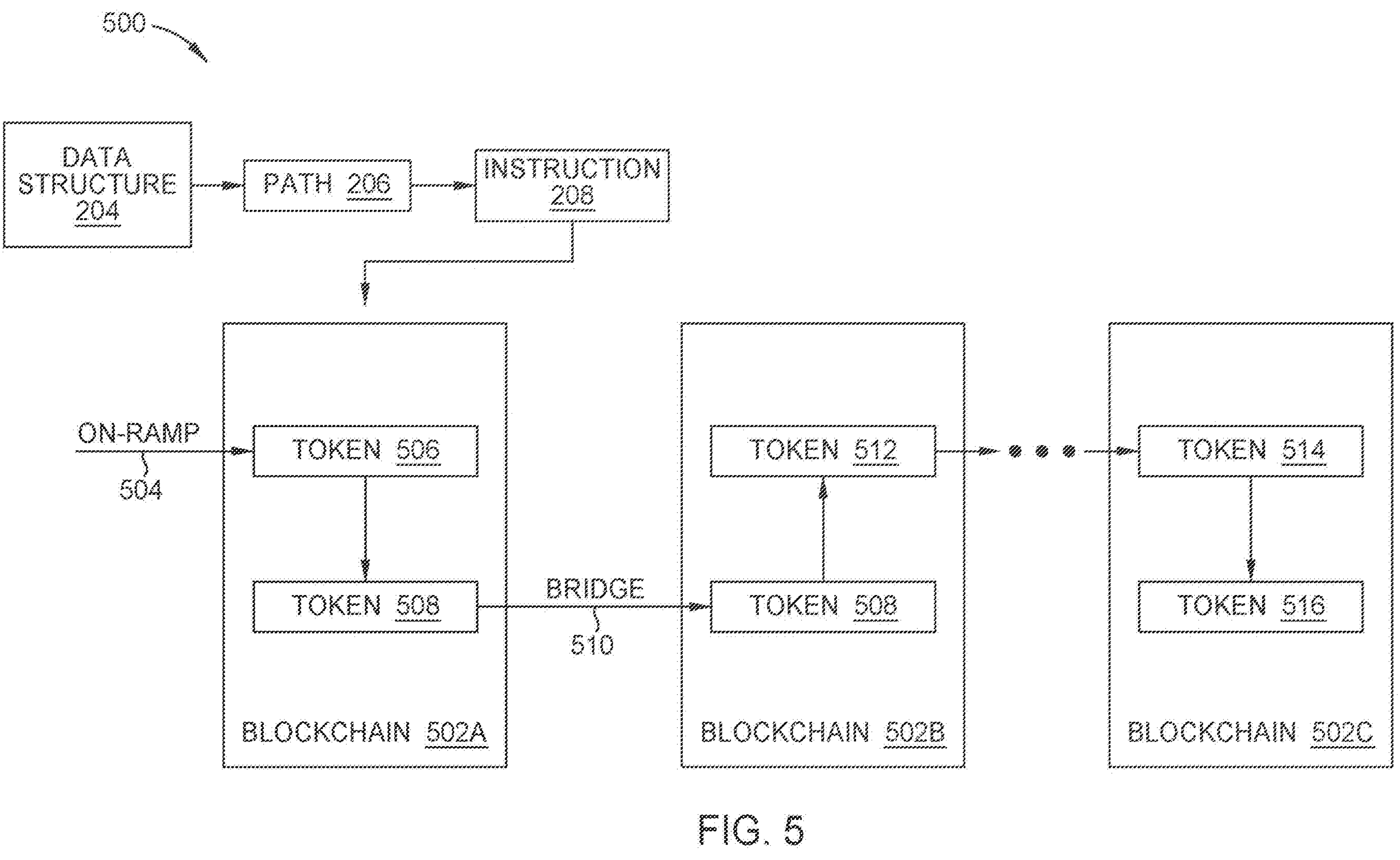
FIG. 5 illustrates an example operation performed by the system of FIG. 1.

FIG. 5 illustrates an example operation 500 performed by the system 100 of FIG. 1. A computer system (e.g., the computer system 102 shown in FIG. 1) may perform the operation 500. By performing the operation 500, the computer system executes an example path.

The computer system begins by determining the path 206 from the data structure 204. The path 206 may indicate how multiple blockchains 502, including a blockchain 502A, a blockchain 502B, and a blockchain 502C (which may be referred to as a destination blockchain) should be used. The computer system follows the path 206 by first using an on-ramp 504 to on-ramp a token 506 on the blockchain 502A. For example, the computer system may exchange a fiat currency for the token 506 on the blockchain 502A. The computer system then follows the path 206 to convert the token 506 into a token 508 on the blockchain 502A. The token 508 may have a different type than the token 506. In some embodiments, the computer system may use a decentralized exchange on the blockchain 502A to convert (e.g., swap) the token 506 for the token 508.

The computer system then generates an instruction 208 to implement the path 206. The instruction 208 may include multiple portions that each implement a step in the determined path 206. The computer system executes the instruction 208 to perform the operations that implement the path 206.

By executing the instruction 208, the computer system follows the path 206 to bridge the token 508 from the blockchain 502A to the blockchain 502B using the bridge 510. The bridge 510 may support the token 508 but not the token 506. After the token 508 is bridged to the blockchain 502B, the token 508 is available to use on the blockchain 502B. The computer system then follows the path to convert the token 508 to a token 512 on the blockchain 502B. The token 512 may have a different type than the token 508. In some embodiments, the computer system may use a decentralized exchange on the blockchain 502B to convert (e.g., swap) the token 508 for the token 512.

The computer system then follows the path 206 to bridge the token 512. The computer system may repeat this process any number of times to convert and bridge tokens across any number of blockchains 502. At the end of the path 206, the computer system may bridge a token 514 onto the blockchain 502C (which may be referred to as a destination blockchain). The computer system then converts the token 514 to a token 516 (which may be referred to as a destination token) on the blockchain 502C. In some embodiments, the computer system may use a decentralized exchange on the blockchain 502C to convert (e.g., swap) the token 514 for the token 516. In this manner, the computer system follows the path 206 to acquire the token 516 on the blockchain 502C. The token 516 is then available for use on the blockchain 502C. In this example, the tokens 506, 508, 512, 508, and 514 may be referred to as intermediate tokens.

As seen in the example operations 300, 400, and 500 shown in FIGS. 3, 4, and 5, the path 206 may indicate any number of token conversions and token bridges using any number of blockchains. The token conversions may occur on any of the blockchains, including the destination blockchain. In this manner, the computer system may determine how to provide interoperability between any number of blockchains.

Figure 6:
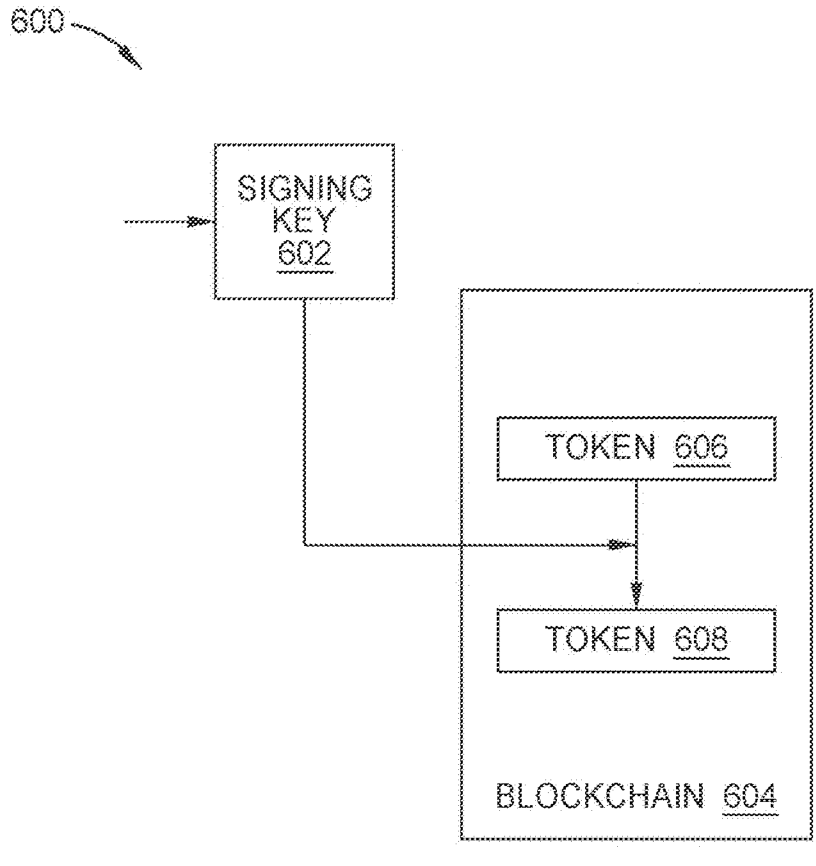
FIG. 6 illustrates an example operation performed by the system of FIG. 1.

FIG. 6 illustrates an example operation 600 performed by the system 100 of FIG. 1. A computer system (e.g., the computer system 102 shown in FIG. 1) may perform the operation 600. By performing the operation 600, the computer system authenticates an operation on a blockchain.

The computer system begins by receiving a signing key 602. The signing key 602 may include cryptographic material provided through authentication of a user. For example, the computer system may leverage a social login provider that derives or provides the signing key 602 after a user authenticates with the social login providers. As another example, the computer system may use information sent by a user during an authentication process to generate the signing key 602. As another example, the computer system may use user device hardware or software to generate the signing key 602.

The computer system may use the signing key 602 to authenticate operations on behalf of the user on a blockchain 604. For example, the computer system may convert (e.g., swap) a token 606 to a token 608 on the blockchain 604. The computer system may authenticate this conversion using the signing key 602, which may indicate that the user has authorized this conversion. In this manner, the computer system improves the security of the conversion.

In some embodiments, the computer system uses other information to authenticate the conversion. For example, the computer system may use a signature (e.g., provided by a user or a hash) to authenticate the conversion. As another example, the computer system may use a hashing algorithm or a property of the hashing algorithm to authenticate the conversion. As another example, the computer system may use an address (e.g., a physical address, a network address, a memory address, a blockchain address, etc.) to authenticate the conversion.

Figure 7:
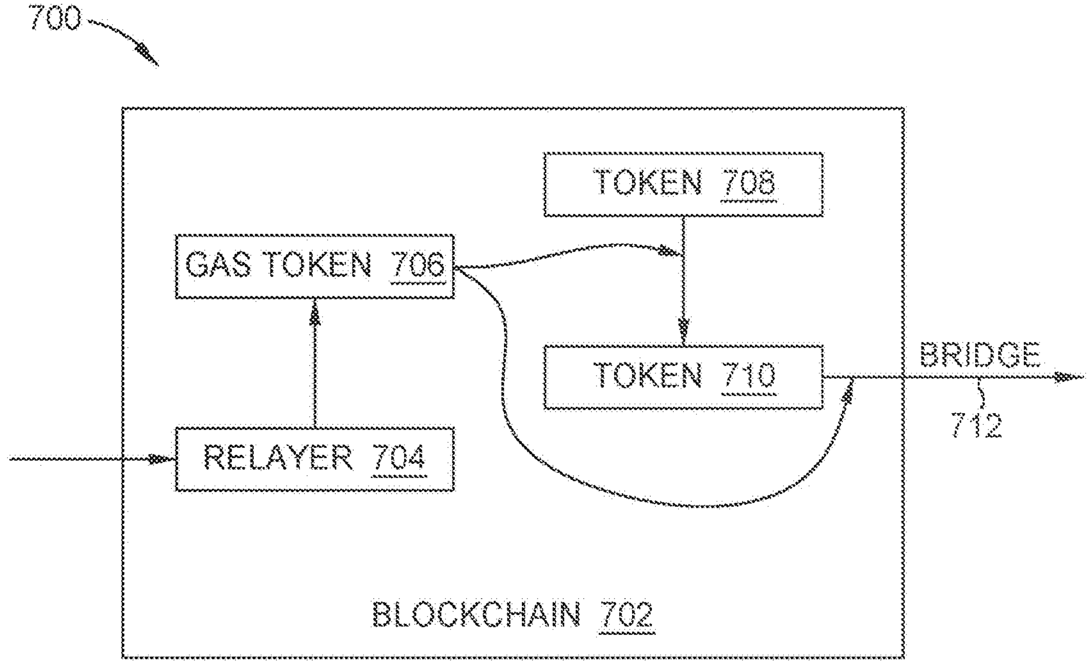
FIG. 7 illustrates an example operation performed by the system of FIG. 1.

FIG. 7 illustrates an example operation 700 performed by the system 100 of FIG. 1. A computer system (e.g., the computer system 102 shown in FIG. 1) may perform the operation 700. By performing the operation 700, the computer system provides gas tokens to power transactions on blockchains.

The computer system begins by using a relayer 704 on a blockchain 702 to provide a gas token 706. For example, the computer system may use the relayer 704 to generate or purchase the gas token 706. The gas token 706 may be used to power or finance operations on the blockchain 702. For example, if the computer system converts (e.g., swaps) a token 708 to a token 710 on the blockchain 702, the computer system may need to power or finance the conversion using the gas token 706 before the conversion occurs. As another example, if the computer system bridges the token 710 from the blockchain 702 using the bridge 712, the computer system may need to power or finance the bridge using the gas token 706 before the bridging occurs. In some embodiments, the relayer 714 includes one or more smart wallets (e.g., a bundler) that are used to sponsor, power, or finance operations on the blockchain 702.

Figure 8:
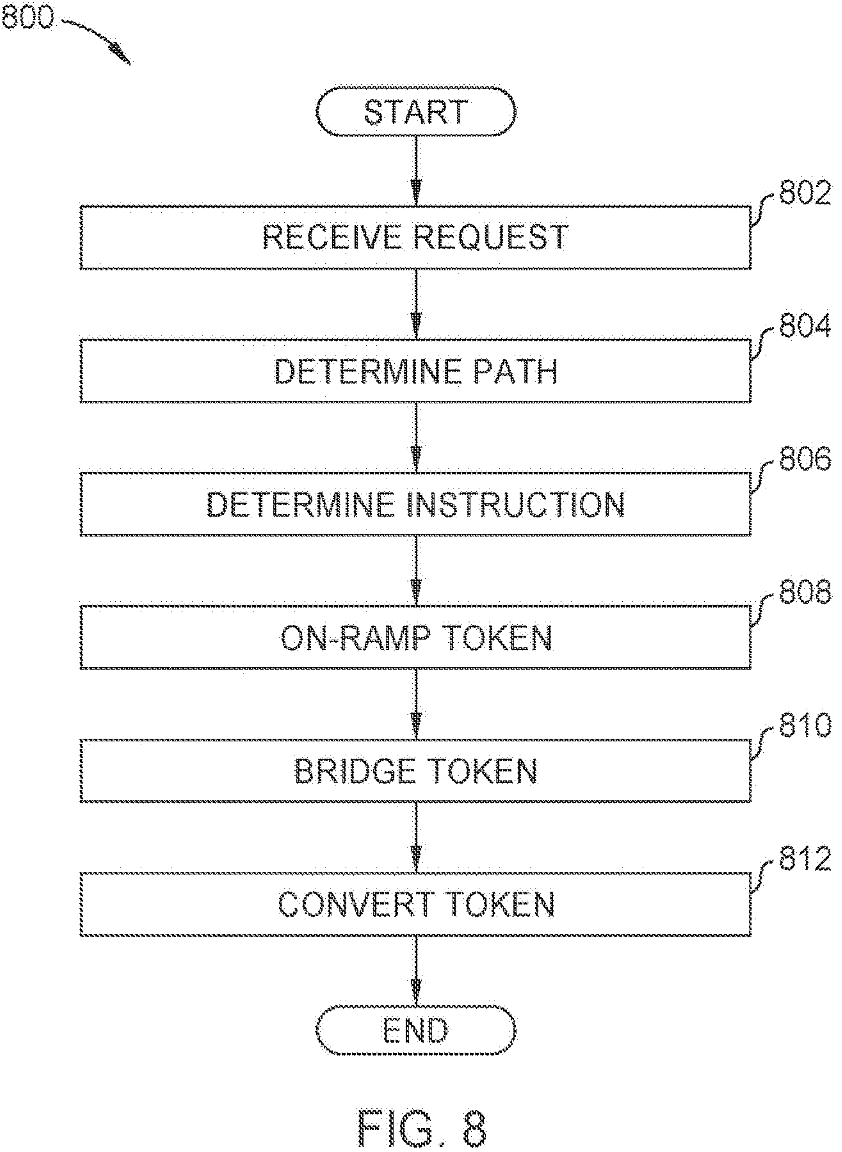
FIG. 8 is a flowchart of an example method performed by the system of FIG. 1.

FIG. 8 is a flowchart of an example method 800 performed by the system 100 of FIG. 1. In certain embodiments, a computer system (e.g., the computer system 102 shown in FIG. 1) performs the method 800.

At 802, the computer system receives a request for a destination token on a destination blockchain. There may be no way to on-ramp the destination token onto the destination blockchain, so the computer system may determine an alternate path to obtain the destination token on the destination blockchain.

At 804, the computer system determines the path for obtaining the destination token on the destination blockchain. The computer system may use a data structure (e.g., a table, list, tree, graph, etc.) to determine the path. The data structure may indicate various blockchains and their capabilities. For example, the data structure may indicate the types of tokens supported by each blockchain, the token conversions that each blockchain supports, the token bridges connected to each blockchain, the on-ramps for each blockchain, etc. Using this information, the computer system may determine a path through one or more blockchains to obtain the destination token on the destination blockchain.

At 806, the computer system determines an instruction that implements the determined path. The instruction may be a batch instruction that includes multiple portions, and each portion may perform an operation (e.g., a conversion/swap, bridge, etc.) that implements a step in the determined path. By executing the instruction, the computer system may execute multiple operations in order, which implements the determined path. In the example of FIG. 8, by executing the instruction, the computer system performs the steps 808, 810, and 812.

At 808, the computer system follows the path to on-ramp a token onto a first blockchain. For example, the computer system may exchange a fiat currency to obtain the token on the first blockchain. The token may be referred to as an intermediate token. At 810, the computer system follows the path to bridge the token from the first blockchain to the destination blockchain, which effectively moves the token to the destination blockchain. At 812, the computer system converts the token to the destination token on the destination blockchain. For example, the computer system may use a decentralized exchange on the destination blockchain to convert (e.g., swap) the token for the destination token. In this manner, the computer system uses the path to obtain the destination token on the destination blockchain.

The path may involve any number of blockchains. For example, the path may indicate any number of token conversions and bridges on or across any number of blockchains before obtaining the destination token on the destination blockchain. These conversions and bridges may occur in any order according to the features supported on each blockchain. For example, in the method 800, if the destination blockchain did not support converting the token into the destination blockchain but the first blockchain did, then the path may indicate that the computer system should first convert the token into the destination token on the first blockchain before bridging the destination token to the destination blockchain.

In summary, the blockchain interoperability system determines pathways for allowing blockchains to interoperate with each other. For example, the system may determine one or more blockchains that provide a path for converting tokens of a first token type for a first blockchain into tokens of a second token type for a second blockchain. As another example, the system may determine one or more blockchains that provide a path for bridging (e.g., moving) the different token types to from the first blockchain to the second blockchain. The system may then conduct these conversions and bridges to allow the first blockchain to interoperate with the second blockchain.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A computer system, comprising:

one or more processors; and one or more memories storing program code that is executable by the one or more processors for causing the one or more processors to perform operations including:

receiving a request for a destination token on a destination blockchain;

based on receiving the request, determining a location of a user who submitted the request;

determining, based on the location of the user, a blockchain path through a plurality of blockchains to obtain the destination token;

generating a batch instruction based on the determined blockchain path, wherein the batch instruction includes a plurality of portions for performing a plurality of blockchain operations on the plurality of blockchains within the blockchain path to obtain the destination token;

submitting the batch instruction to a blockchain system for executing the plurality of blockchain operations;

after submitting the batch instruction to the blockchain system, detecting an error with the execution of a particular blockchain operation among the plurality of blockchain operations;

in response to detecting the error, generating an adjusted batch instruction that resolves the error with the particular blockchain operation, wherein the adjusted batch instruction is generated by modifying a particular portion of the batch instruction corresponding to the particular blockchain operation; and submitting the adjusted batch instruction for execution by the blockchain system.

2. The computer system of claim 1, wherein the operations further comprise:

determining, based on one or more data structures, a blockchain on which an intermediate token can be on-ramped, the blockchain being included in the plurality of blockchains; and generating the batch instruction to include a sub-instruction configured to on-ramp the intermediate token onto the blockchain.

3. The computer system of claim 1, wherein the operations further comprise:

determining, based on one or more data structures, a blockchain on which an intermediate token can be converted into the destination token, the blockchain being included in the plurality of blockchains; and generating the batch instruction to include a sub-instruction configured to convert the intermediate token into the destination token on the blockchain.

4. The computer system of claim 1, wherein the operations further comprise:

determining, based on one or more data structures, a blockchain on which an intermediate token can be bridged from a first blockchain to a second blockchain, the first blockchain and the second blockchain being included in the plurality of blockchains; and generating the batch instruction to include a sub-instruction configured to bridge the intermediate token from the first blockchain to the second blockchain.

5. The computer system of claim 1, wherein the operations further comprise:

authenticating a blockchain operation of the plurality of blockchain operations to be performed on a blockchain of the plurality of blockchains based on (i) a signing key, (ii) a signature, (iii) a hashing algorithm, or (iv) an address.

6. The computer system of claim 1, wherein the operations further comprise:

providing a gas token for converting an intermediate token into the destination token on a blockchain of the plurality of blockchains.

7. The computer system of claim 1, wherein the operations further comprise:

determining the blockchain path through the plurality of blockchains based on one or more predefined data structures.

8. The computer system of claim 7, wherein the one or more data structures is a table.

9. A method comprising:

receiving, by one or more processors, a request for a destination token on a destination blockchain;

based on receiving the request, determining, by the one or more processors, a location of a user who submitted the request;

determining, by the one or more processors and based on the location of the user, a blockchain path through a plurality of blockchains to obtain the destination token;

generating, by the one or more processors, a batch instruction based on the determined blockchain path, wherein the batch instruction includes a plurality of portions for performing a plurality of blockchain operations on the plurality of blockchains within the blockchain path to obtain the destination token;

submitting, by the one or more processors, the batch instruction to a blockchain system for executing the plurality of blockchain operations;

after submitting the batch instruction to the blockchain system, detecting, by the one or more processors, an error with the execution of a particular blockchain operation among the plurality of blockchain operations;

in response to detecting the error, generating, by the one or more processors, an adjusted batch instruction that resolves the error with the particular blockchain operation, wherein the adjusted batch instruction is generated by modifying a particular portion of the batch instruction corresponding to the particular blockchain operation; and submitting, by the one or more processors, the adjusted batch instruction for execution by the blockchain system.

10. The method of claim 9, further comprising:

determining, based on one or more data structures, a blockchain on which an intermediate token can be on-ramped, the blockchain being included in the plurality of blockchains; and generating the batch instruction to include a sub-instruction configured to on-ramp the intermediate token onto the blockchain.

11. The method of claim 9, further comprising:

determining, based on one or more data structures, a blockchain on which an intermediate token can be converted into the destination token, the blockchain being included in the plurality of blockchains; and generating the batch instruction to include a sub-instruction configured to convert the intermediate token into the destination token on the blockchain.

12. The method of claim 9, further comprising:

determining, based on one or more data structures, a blockchain on which an intermediate token can be bridged from a first blockchain to a second blockchain, the first blockchain and the second blockchain being included in the plurality of blockchains; and generating the batch instruction to include a sub-instruction configured to bridge the intermediate token from the first blockchain to the second blockchain.

13. The method of claim 9, further comprising:

authenticating a blockchain operation of the plurality of blockchain operations to be performed on a blockchain of the plurality of blockchains based on (i) a signing key, (ii) a signature, (iii) a hashing algorithm, or (iv) an address.

14. The method of claim 9, further comprising:

providing a gas token for converting an intermediate token into the destination token on a blockchain of the plurality of blockchains.

15. The method of claim 9, further comprising:

determining the blockchain path through the plurality of blockchains based on one or more predefined data structures.

16. The method of claim 15, wherein the one or more data structures is a list.

17. A non-transitory computer-readable medium storing program code that is executable by one or more processors for causing the one or more processors to perform operations including:

receiving a request for a destination token on a destination blockchain;

based on receiving the request, determining a location of a user who submitted the request;

determining, based on the location of the user, a blockchain path through a plurality of blockchains to obtain the destination token;

generating a batch instruction based on the determined blockchain path, wherein the batch instruction includes a plurality of portions for performing a plurality of blockchain operations on the plurality of blockchains within the blockchain path to obtain the destination token;

submitting the batch instruction to a blockchain system for executing the plurality of blockchain operations;

after submitting the batch instruction to the blockchain system, detecting an error with the execution of a particular blockchain operation among the plurality of blockchain operations;

in response to detecting the error, generating an adjusted batch instruction that resolves the error with the particular blockchain operation, wherein the adjusted batch instruction is generated by modifying a particular portion of the batch instruction corresponding to the particular blockchain operation; and submitting the adjusted batch instruction for execution by the blockchain system.

18. The non-transitory computer-readable medium of claim 17, wherein the plurality of blockchain operations includes an on-ramping operation for on-ramping an intermediate token.

19. The non-transitory computer-readable medium of claim 17, wherein the plurality of blockchain operations includes a conversion operation for converting an intermediate token to another token.

20. The non-transitory computer-readable medium of claim 17, wherein the plurality of blockchain operations includes a bridging operation for bridging an intermediate token from a first blockchain to a second blockchain.

* * * * *